April 27, 1965 J. R. CLARK 3,181,014

VARIABLE ELECTRONIC TIMER APPARATUS

Filed Oct. 15, 1962

INVENTOR.
John R. Clark

BY

Hovey, Schmidt, Johnson & Hovey
ATTORNEYS.

3,181,014

VARIABLE ELECTRONIC TIMER APPARATUS

John R. Clark, Tulsa, Okla., assignor, by mesne assignments, to Midwestern Instruments, Inc., Tulsa, Okla., a corporation of Oklahoma

Filed Oct. 15, 1962, Ser. No. 230,500

11 Claims. (Cl. 307—141.4)

Figures 1, 2:
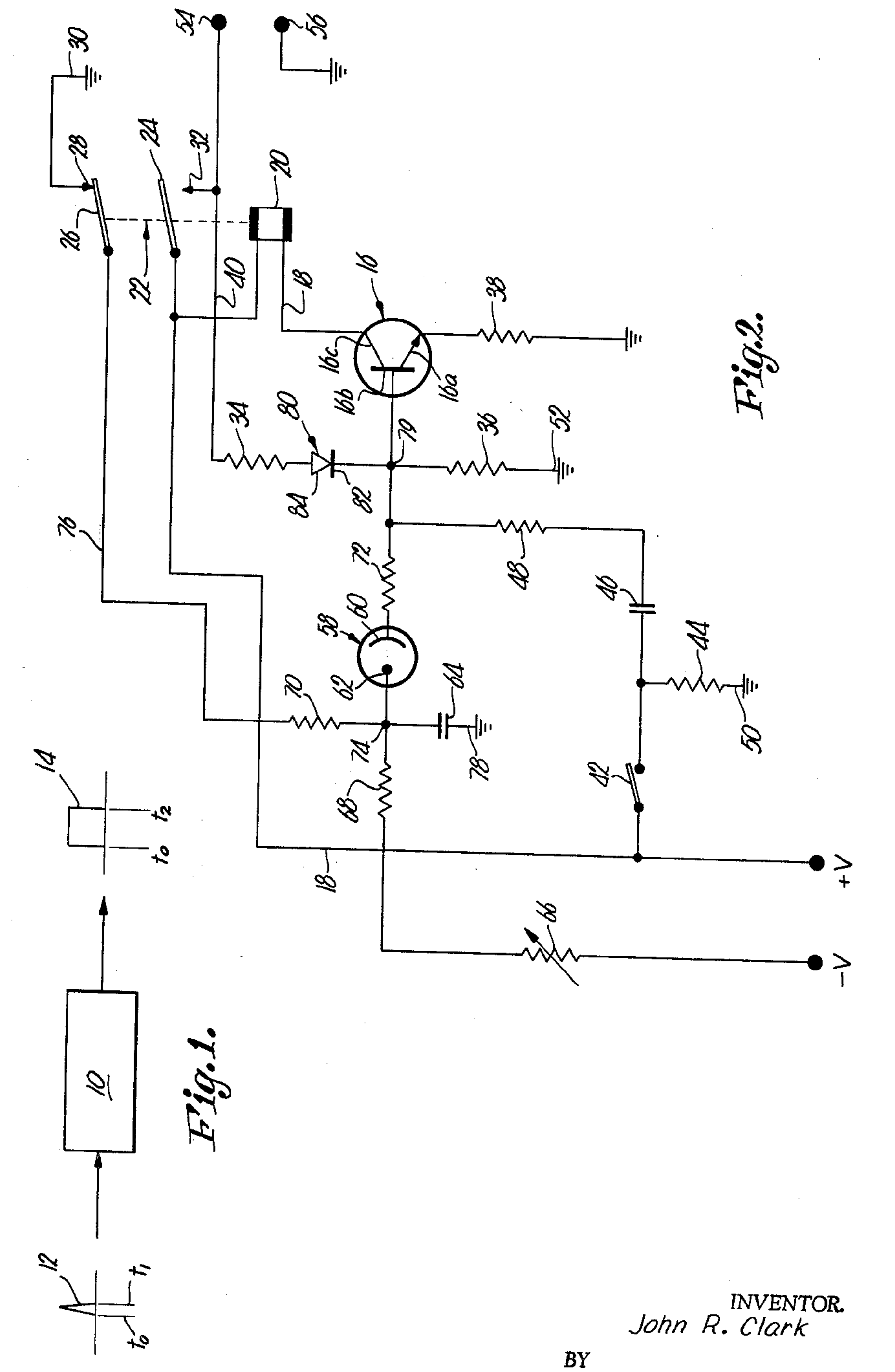

This invention relates generally to improvements in electronic timers and, more specifically, to electronic timing apparatus for producing a triggered timing pulse of precise controllable width.

Electronic timers have widespread application in the various electrical arts and in other fields involving a variety of applications where time control is required. These timers include a number of different devices for general purpose use as well as apparatus designed for specific applications.

This invention relates primarily to those timing applications which require an electronic device capable of undergoing a change of state for a precise controllable time. Such a device may comprise a pulse generator capable of generating an output pulse of a predetermined width. The timed pulse may be utilized to actuate other electrical apparatus for a predetermined time duration for the testing of such apparatus or for other control purposes.

The use of electronic timers being widespread and covering such a variety of applications, the cost of these timers can often become an important factor in their practical utilization. Although many timing circuits have been heretofore developed, the need for developing a reliable timing device of minimum production cost exists.

It is, therefore, an object of this invention to provide a dependable and relatively inexpensive electronic timer having an operative or timing state of a predetermined time duration.

It is another object of this invention to provide such a timer having a variable timing cycle that may be precisely controlled.

It is still another object of this invention to provide apparatus for producing an output pulse of precise controllable width.

It is yet another object of this invention to provide such a timing device or pulse apparatus operable in response to a trigger pulse for a predetermined duration of time commencing simultaneously with said trigger pulse.

Other objects will become apparent as the detailed description proceeds.

In the drawing:

FIGURE 1 is a diagrammatic illustration of the general concept underlying the present invention; and FIG. 2 is a schematic diagram of the present invention shown in an embodiment for producing triggered output pulses of positive polarity and of controllable width.

Referring to FIG. 1, the invention is represented diagrammatically by a block designated 10. FIG. 1 illustrates that when a trigger or spike pulse 12 is applied to the apparatus a rectangular pulse 14 appears from the output thereof. Spike pulse 12 commences at a time $t_0$ and terminates at a time $t_1$. Output pulse 14 commences at time $t_0$ and terminates at time $t_2$. It is the primary function of the present invention to respond to trigger pulse 12 in a manner to produce output pulse 14 of a controllable time width equal to $t_2—t_0$. It should be understood that this output pulse does not limit the application of the present invention to utilization as a pulse generator in the usual sense, as the output pulse in general merely represents a change in the state of the apparatus 10 from an inoperative or normal state to an operative or timing state, the length of the timing state corresponding to the time duration represented by $t_2—t_0$. The normal state, of course, corresponds to a no output condition of apparatus 10.

Referring to FIG. 2, the circuitry of an embodiment of the present invention is shown.

It should be understood in FIG. 2 that the power sources for providing the potentials represented by the leads labeled +V and —V are not shown. Furthermore, the ground connections correspond to the other electrical side of these power sources, the leads labeled +V and —V being, respectively, positive and negative with reference to the ground connections.

An NPN transistor 16 having an emitter 16*a*, a base 16*b* and a collector 16*c* is utilized in combination with other components, to be described hereinafter, to control the state of the apparatus. When the emitter-collector circuit of transistor 16 is not conducting current, the apparatus is in the inoperative or normal state. Conversely, when the emitter-collector circuit of transistor 16 is conducting, the apparatus is in the operative or timing state. It should be understood that this conduction of current refers to the conduction of substantial electric current and that spurious conduction, such as the passage of leakage currents, is not included.

The transistor 16 is normally maintained with its emitter-collector circuit nonconducting, as no potential is applied to base 16*b* when the apparatus is not in timing operation. The lead labeled +V maintains the collector 16*c* at a positive potential by connection therewith along conductor 18. The coil 20 of an electromechanical relay 22 is interposed in series with conductor 18. Relay 22 has a normally open switch 24 and a normally closed switch 26 (switches 24 and 26 will be referred to as in their "normal" condition when the relay coil 20 is deenergized, the positions of the switches then being as shown in FIG. 2). Switch 26 is normally engaged with contact 28 which is grounded as at 30. Switch 24 is normally in the open position as shown and therefore disengaged from contact 32.

The bias circuit of transistor 16 comprises resistors 34, 36 and 38. The bias circuitry is placed in operation when relay coil 20 is energized, thus closing switch 24 and connecting resistor 34 with lead 18 along conductor 40. The bias circuitry is of the voltage divider type and supplies the proper potentials for the emitter-base and the base-collector junctions of transistor 16.

It may be noted, however, that the bias potentials for transistor 16 will not be applied thereto to place the emitter-collector circuit in conduction until such time as switch 24 is closed by the energization of relay coil 20. Such energization is effected by the closing of a normally open switch 42 which momentarily couples the +V lead with base 16*b*. This coupling is effected by the action of the voltage produced across resistor 44 and differentiated by capacitor 46 and resistor 48. More specifically, when switch 42 is closed, resistor 44 is thereby connected directly across the +V lead and ground at 50. Resistor 36 connects base 16*b* to ground at 52. Although lead +V represents a source of direct current, such current will momentarily flow across capacitor 46 and through resistor 48 to couple resistors 36 and 44 in parallel. The differentiating action of capacitor 46 and resistor 48 produces a sharp spike or trigger pulse across resistor 36 which forward biases the emitter-base junction of transistor 16. This causes the emitter-collector circuit to conduct, thus energizing relay coil 20 and closing switch 24. The closure of switch 24 connects the +V lead along conductors 18 and 40 to the aforementioned bias circuitry of transistor 16 and thus maintains the emitter-collector circuit in the conducting condition. It may be seen, therefore, that the action of switch 24 upon energization of relay coil 20 holds the transistor in the conducting condition in response to the trigger pulse.

An output terminal 54 is connected with conductor 40 and contact 32. A ground connection forms the other electrical side of the output and is represented by output terminal 56. During transistor conduction, it is apparent that an output pulse may be obtained across output terminals 54 and 56 as such terminals are directly connected across the +V lead and ground.

The diagrammatic illustration of FIG. 1 may now be fully appreciated. The trigger pulse 12 is produced by the closing of switch 42 and the action of the differentiator circuitry. The output pulse 14 is obtained across terminals 54 and 56 until time $t_2$. At time $t_2$ the timing circuitry of FIG. 2, to be hereinafter described, produces a trigger pulse of opposite polarity to that of trigger pulse 12 and effects precise cut-off of pulse 14.

The timing circuitry of the present invention comprises a gas diode 58 having an anode 60 and a cathode 62, a capacitor 64, resistors 66, 68, 70 and 72, and switch 26. Resistor 70 is connected to junction point 74 and with switch 26 by conductor 76. Capacitor 64 is connected from junction point 74 to ground at 78. The diode 58 and resistor 72 are connected in series between junction point 74 and base 16b. Junction point 74 is connected with the —V supply lead which contains resistors 66 and 68.

It may be seen that, prior to the energization of relay coil 20, resistor 70 is connected between junction point 74 and ground at 30, thus shunting across capacitor 64. Resistor 70 is maintained at a low ohmic value. Thus, prior to the initiation of the timing cycle, a circuit exists from the —V lead to junction point 74, through resistor 70, and hence along conductor 76 to ground at 30.

The energization of relay coil 20 which closes switch 24 also opens switch 26 and thereby places the timing circuit in operation at the time $t_0$ when the transistor is fired by trigger pulse 12. Resistor 70 is thus disconnected from the timing circuit. This places capacitor 64 across the negative power source from junction point 74 to ground at 78. The capacitor will now charge exponentially until the voltage thereacross reaches the ionization potential of the gas within the envelope of diode 58. When the ionization potential is reached, diode 58 breaks down and current is allowed to flow through resistor 72 to the base 16b of transistor 16. This reverse biases the emitter-base junction of the transistor and terminates the flow of current in the emitter-collector circuit. Relay coil 20 is thus de-energized and the timing cycle of the apparatus is terminated. Since the timing circuit interconnects with the bias circuitry of the transistor at junction point 79, a diode 80 having a cathode 82 and an anode 84 is connected in series between junction point 79 and resistor 34 to block the positive trigger pulse 12 and thus isolate the +V lead and terminal 54 from the pulse 12.

A number of gas diodes of either the cold-cathode or hot-cathode type are suitable for use in the timing circuitry of the present invention. The gas within the diode may be mercury vapor or an inert gas such as neon. Gas diodes exhibit the phenomenon of presenting an open circuit from cathode to anode until the voltage thereacross reaches a value equal to the ionization potential of the gas. When the ionization potential is applied across the cathode and anode terminals, the tube breaks down due to the ionization of the gas and conducts an electric current. The voltage drop across the diode during conduction is essentially constant, regardless of the value of the current being conducted through the tube.

It may be appreciated that the effect produced by the conduction of diode 58 is the introduction of a trigger pulse to the base 16b of a polarity opposite to that of trigger pulse 12. The magnitude of the —V potential, the ionization potential of the gas in diode 58 and the ohmic value of resistor 72 must, of course, be chosen so that the magnitude of the negative trigger pulse will be sufficient to override the positive potential on base 16b.

The width of the output pulse obtained across output terminals 54 and 56 is determined from the following formula:

$$e_c = E(1-\epsilon^{-t/RC}) = \text{ionization potential of the gas}$$

where $e_c$=voltage across capacitor 64
$E$=—V supply voltage
$R$=ohmic value of resistor 66 plus resistor 68
$C$=capacity of capacitor 64 in farads
$t$=pulse width $(t_2-t_0)$ in seconds therefore, $$t = RC \ln \frac{E}{E-e_c}$$

Variation of the pulse width may be determined by altering any of the variables in the above equation. However, the resistance of the RC circuit may be most conveniently varied such as by utilizing a rheostat for resistor 66 and calibrating the rheostat over the range of time cycle settings.

The width of the output pulse may be varied from a minimum width of less than a second to a maximum width of several minutes. For these pulse widths the pull-in and drop-out times of the relay 22 may be considered negligible. A relay having a low mass armature should be utilized. Since the function of transistor 16 is to energize or de-energize relay coil 20 in response to trigger pulses, the effect of its parameter variations with temperature and aging is negligible. The ionization potential of a particular gas in diode 58 is also not subject to variation. Therefore, the ultimate result is the production of timed pulses of precise width.

It will be appreciated by those skilled in the art that the apparatus illustrated in FIG. 2 may be utilized to produce negative pulses by merely employing a PNP transistor and reversing the polarities of the supply leads and the connections to diodes 58 and 80.

Having thus described the invention what is claimed as new and desired to be secured by Letters Patent is:

1. Electronic timing apparatus having an inoperative or normal state and an operative or timing state of a predetermined time duration comprising:
- a source of electrical power;
- a bistate electrical device having a nonconducting state corresponding to the inoperative state of the apparatus and a current conducting state corresponding to the operative state of the apparatus, and including circuit means for conducting substantial electrical current when said device is in the conducting state and means responsive to an electrical potential for controlling the state of said device;
- means connecting said circuit means across said power source;
- trigger means coupled with said state controlling means for permitting selective application of a trigger pulse thereto of one polarity for a time duration less than the predetermined duration to place said device in the conducting state and thereby cause conduction of substantial current by said circuit means;
- holding means responsive to said current conduction and coupled with said state controlling means for applying a first electrical potential thereto of said one polarity to maintain said device in the conducting state after the termination of said trigger pulse; and
- timing means coupled with said state controlling means and operable at the end of said predetermined time duration to apply a second potential of the opposite polarity to said state controlling means to return said device to the nonconducting state.

2. Apparatus as set forth in claim 1, wherein said timing means includes a trigger pulse source of said opposite polarity and electrical delay means responsive to said current conduction for coupling said pulse of opposite polarity with said state controlling means at the end of the predetermined time duration.

3. Apparatus as set forth in claim 1, wherein said timing means includes a source of electrical potential of said opposite polarity, a capacitor, means responsive to said current conduction for coupling said capacitor across said last-mentioned source to permit said capacitor to charge, a gas diode, and means operably coupling said gas diode with said capacitor and said state controlling means, whereby a trigger pulse of said opposite polarity is applied to said state controlling means when the voltage across said capacitor reaches the ionization potential of the gas in the diode.

4. Electronic timing apparatus having an inoperative or normal state and an operative or timing state of a predetermined time duration comprising:

a source of electrical power;

a transistor having an emitter, a base, and a collector element;

circuit means connecting the emitter-collector circuit of said transistor across said source;

trigger means coupled with the base of said transistor for permitting selective application of a trigger pulse thereto of one polarity for a time duration less than the predetermined duration to forward bias the emitter-base junction of the transistor, whereby to cause conduction of substantial electric current by the emitter-collector circuit of said transistor;

holding means responsive to said current conduction and coupled with said base for applying a first electrical potential thereto of said one polarity to maintain said current conduction after the termination of said trigger pulse; and timing means coupled with said base and operable at the end of said predetermined time duration to apply a second potential of the opposite polarity to said base having sufficient magnitude to offset said first potential and cut off said transistor, whereby to terminate said current conduction at the end of the predetermined time duration.

5. Apparatus as set forth in claim 4, wherein said timing means includes a trigger pulse source of said opposite polarity and electrical delay means responsive to said current conduction for coupling said pulse of opposite polarity with said base at the end of the predetermined time duration.

6. Apparatus as set forth in claim 4, wherein said timing means includes a source of electrical potential of said opposite polarity, a capacitor, means responsive to said current conduction for coupling said capacitor across said last-mentioned source to permit said capacitor to charge, a gas diode, and means operably coupling said gas diode with said capacitor and said base, whereby a trigger pulse of said opposite polarity is applied to said base when the voltage across said capacitor reaches the ionization potential of the gas in the diode.

7. Apparatus for producing a triggered output pulse of positive polarity and of controllable width comprising:

a unidirectional current, electrical power source means having a positive output terminal, a negative output terminal, and a ground terminal;

a pair of output terminals, one of said output terminals being electrically connected with said ground terminal;

an NPN transistor having an emitter terminal, a base terminal, and a collector terminal;

circuit means connecting said collector terminal with said positive terminal and said emitter terminal with said ground terminal;

trigger means coupling said positive terminal with said base terminal for permitting selective application of a positive trigger pulse thereto having a width less than the width of the output pulse to permit the conduction of substantial electric current by said circuit means;

holding means responsive to said current conduction for electrically interconnecting said base terminal and said positive terminal to maintain said current conduction after the termination of said positive trigger pulse, said holding means including electrically responsive switch means coupled with said circuit means and operable to electrically connect the other output terminal with said positive terminal when said circuit means is conducting; and timing means responsive to said current conduction for coupling said negative terminal with said base terminal to terminate said current conduction after a predetermined time duration corresponding to the desired output pulse width.

8. Apparatus as set forth in claim 7, wherein said timing means includes a capacitor, means responsive to said current conduction for coupling said capacitor with said negative and ground terminals to permit said capacitor to charge, a gas diode, and means operably coupling said gas diode with said capacitor and said base terminal, whereby a negative trigger pulse is applied to said base terminal when the voltage across said capacitor reaches the ionization potential of the gas in the diode.

9. Apparatus as set forth in claim 7, wherein said timing means includes a circuit comprising a capacitor connected in series with a resistance, means connecting said circuit across said negative and ground terminals with the resistance connected to the negative terminal and the capacitor connected to the ground terminal, shunt means connected across said capacitor, second electrically responsive switch means interposed in said shunt means and operable to disconnect said shunt means when said circuit means is conducting, thereby permitting said capacitor to charge, a gas diode, and electrical means connecting said gas diode to said base terminal and the interconnection of said capacitor and resistance, whereby a negative trigger pulse is applied to said base terminal when the voltage across said capacitor reaches the ionization potential of the gas in the diode.

10. Electronic timing apparatus having an inoperative or normal state and an operative or timing state of a predetermined time duration comprising:

a source of electrical power;

a transistor having an emitter, a base, and a collector element;

circuit means connecting the emitter-collector circuit of said transistor across said source;

trigger means coupled with the base of said transistor for permitting selective application of a trigger pulse thereto of one polarity for a time duration less than the predetermined duration to permit the conduction of substantial electric current by the emitter-collector circuit of said transistor;

holding means responsive to said current conduction and coupled with said base for applying an electrical potential thereto of said one polarity to maintain said current conduction after the termination of said trigger pulse; and timing means responsive to said current conduction and coupled with said base for providing a potential to oppose said holding means potential to terminate said current conduction at the end of the predetermined time duration, said timing means including a source of electrical potential of the opposite polarity, a capacitor, a resistance, means connecting said capacitor and resistance in series across said last-mentioned source, shunt means connected across said capacitor, electrically responsive switch means interposed in said shunt means and operable to disconnect said shunt means when said emitter-collector circuit is conducting, thereby permitting said capacitor to charge, a gas diode, and circuit means connecting said gas diode and the emitter-base junction of said transistor in series across said capacitor, whereby a trigger pulse of the opposite polarity is applied to said base when the voltage across said capacitor reaches the ionization potential of the gas in the diode.

11. Apparatus as set forth in claim 10, wherein said holding means comprises a second electrically responsive switch means operable to electrically interconnect said collector and base when said emitter-collector circuit is conducting.

References Cited by the Examiner

UNITED STATES PATENTS

| | | | |
|---|---|---|---|
| 2,852,702 | 9/58 | Pinckaers | 307—132 |
| 3,019,356 | 1/62 | Tepolt et al. | 307—132 |
| 3,090,874 | 5/63 | Rosene | 307—132 |
| 3,113,242 | 12/63 | Leeder | 307—132 |

MILTON O. HIRSHFIELD, *Primary Examiner*.